E. Perce,
Geographical Globe.
N°. 41,938.                    Patented Mar. 15, 1864.

Witnesses:
D. Robertson
Thos. S. Douglas

Inventor:
Elbert Perce

UNITED STATES PATENT OFFICE.

ELBERT PERCE, OF BROOKLYN, NEW YORK.

IMPROVEMENT IN GEOGRAPHICAL GLOBES.

Specification forming part of Letters Patent No. 41,938, dated March 15, 1864.

*To all whom it may concern:*

Be it known that I, ELBERT PERCE, of Brooklyn, in the county of Kings and State of New York, have invented a new and useful Improvement in the Manufacture of Geographical Globes; and I do hereby declare that the following is a full, clear, and exact description thereof, reference being had to the accompanying drawings, making a part of this specification, in which—

Figure 1:
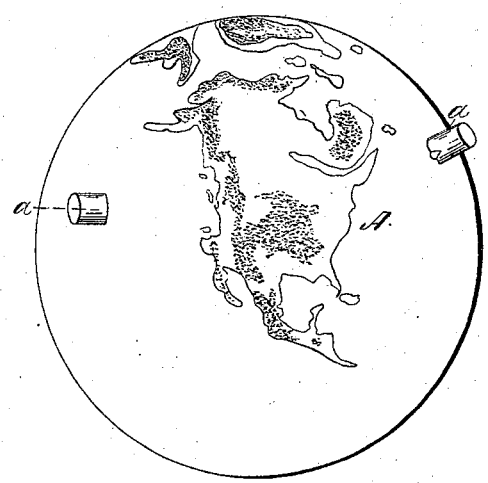
Figure 2:
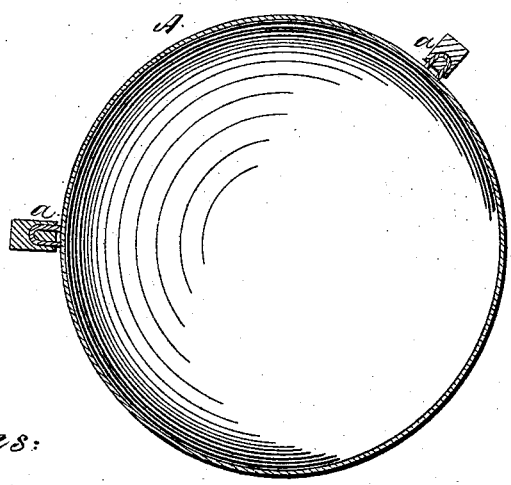

Figure 1 is a side elevation of my invention. Fig. 2 is a central section of the same.

Similar letters of reference indicate corresponding parts in the two figures.

The nature of my invention consists in the production of geographical globes with magnetic properties by making them of or covering their surfaces with a metal possessing magnetic properties, so that small objects also possessing magnetic properties will be attracted to and will adhere to the surface of a globe thus constructed, and thus enable the illustration to the eye of the principle of the attraction of the earth's center.

To enable others skilled in the art to make and use my invention, I will proceed to describe it.

A represents a globe made of any of the usual sizes of thin sheet metal by cutting and stamping the metal into pieces of a proper shape, so that when they are united by soldering or other known means of joining metals a hollow sphere will be formed.

The physical features of the earth's surface, land and water, and its rivers, mountains, &c., can be delineated upon the surface of the globe by any of the known methods, and a geographical globe is thus produced of superior lightness, durability, and cheapness.

If it is desired to illustrate the attraction of the earth's center, the globe is made of sheet-iron or soft sheet-steel, and the objects $a\ a$, as shown in the accompanying drawings, which are to be used to illustrate the principle of the attraction, are made of steel, and converted into permanent magnets by any of the known means, so that said objects, or any one of them, will be attracted to and will adhere to the surface of the globe by magnetic attraction.

The objects $a\ a$ can be made, either in whole or in part, of steel or iron, it being essential only that such portions of the objects as come in contact with the surface of the globe shall possess magnetic properties, or, instead of this, the globe can be made of soft sheet-steel, which, after being cut and formed into the proper shape, may be hardened and converted into a permanent magnet by any of the known means, or it may be made a solid sphere of iron and converted into a permanent magnet, so that small objects made of iron or steel, not permanent magnets, will be attracted to and will adhere to its surface by the force of magnetic attraction. All these methods, whether the globe itself is a permanent magnet or whether the objects only are permanent magnets, are embraced within my invention, so long as the desired purpose of attracting and retaining the objects to the surface of the globe by magnetic attraction is attained.

What I claim as my invention, and desire to secure by Letters Patent, is—

A geographical globe with magnetic properties, so that small objects made of steel or iron will be attracted and retained by the force of magnetic attraction, in the manner and for the purpose above specified.

ELBERT PERCE.

Witnesses:
D. ROBERTSON,
THOS. J. DOUGLAS.